Dec. 30, 1930.                W. T. CARLING                1,786,980
                           CHANGE GEAR MECHANISM
                          Filed Oct. 3, 1929       2 Sheets-Sheet 1
Fig.1.                                              Fig. 2.
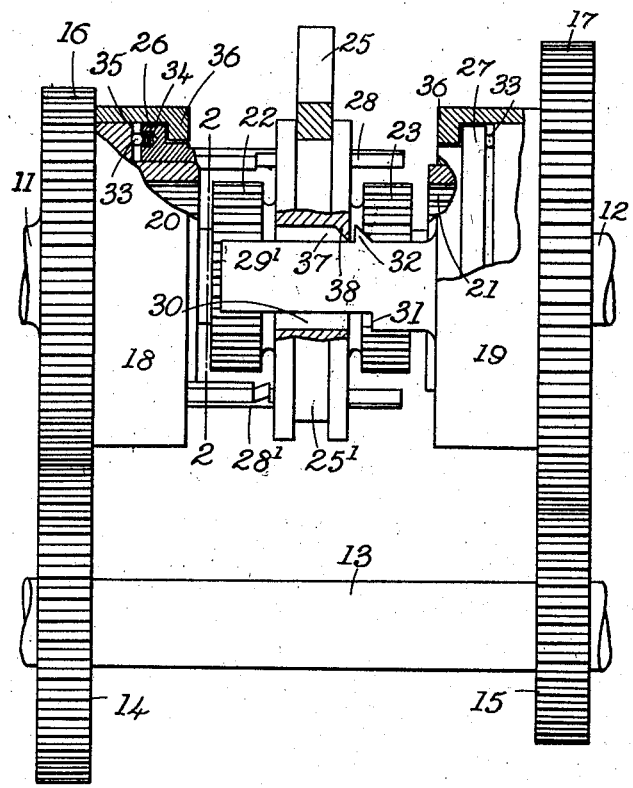
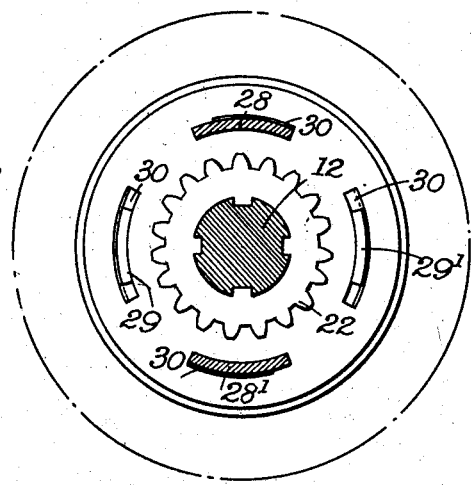
Fig. 3.                                             Fig. 4.
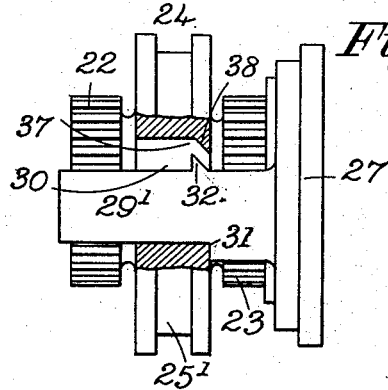
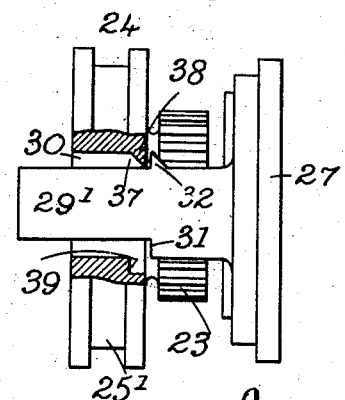
Inventor:—
William T. Carling,
By:—
Smith, Michael and Gardiner,
Attorneys.

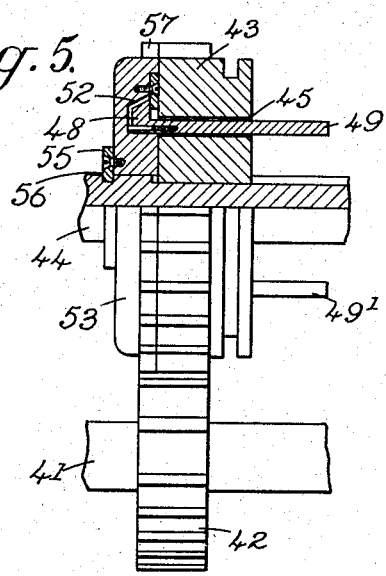
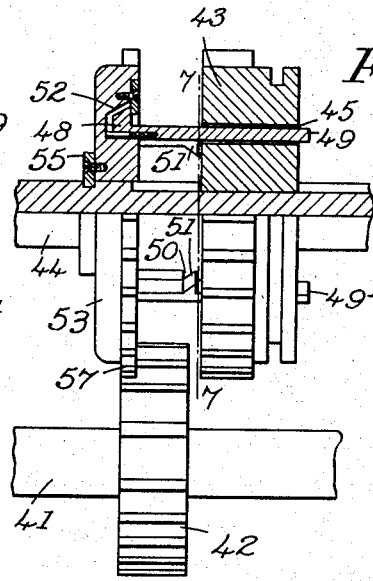
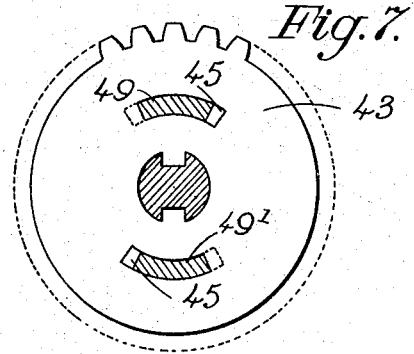
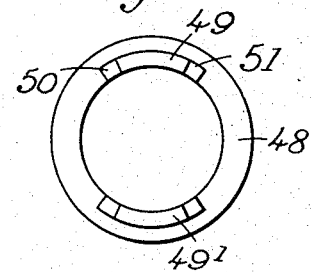
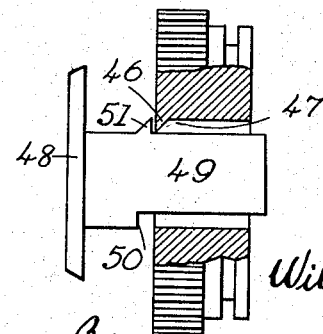

Patented Dec. 30, 1930

1,786,980

UNITED STATES PATENT OFFICE

WILLIAM THOMAS CARLING, OF GUILDFORD, ENGLAND

CHANGE-GEAR MECHANISM

Application filed October 3, 1929, Serial No. 397,078, and in Great Britain October 3, 1928.

This invention relates to change gear mechanism in which the engagement of the various gears as selected by the operator is controlled by locking means to prevent inopportune engagement.

The invention is applicable to change gear mechanism of the kind in which the various gears are engaged by sliding a selected gear axially into mesh with a gear upon another shaft. It is also applicable to change gear mechanism of the kind in which various pairs of gears in constant mesh are provided with positive clutches for transmitting the drive through any selected pair of gears. Further it is applicable to change gear mechanism in which one or more gears can be engaged selectively by the operation of a positive clutch or clutches, while the remaining gear or gears is or are engaged by sliding a selected gear into mesh with another gear upon an adjacent shaft.

The main object of the invention is to provide improved locking means for preventing the engagement of any selected gear until the parts to be engaged are rotating at suitable relative speeds.

The invention has also for its object to afford greater security that the engagement or change of gears shall be effected with the maximum of ease and quietness.

A further object of the invention is to provide a double locking effect, which permits an initial movement towards engagement of the selected gear at the moment when the member previously rotating at the lower peripheral or pitch-line speed is caused to overtake the other member, and a final movement into engagement at the moment when the speed relation of the two members commences to reverse a second time.

The invention is hereafter described with reference to the accompanying drawings, in which:—

Figure 1 is an elevation partly in section of a change gear mechanism controlled by positive clutches and embodying the present invention.

Figure 2 is an end elevation in section upon the line 2—2 of Figure 1.

Figure 3 is a detail of the sectioned central portion of Figure 1, but showing the position of the locking device after the sliding clutch member has passed the first lock and come up against the second lock in its movement toward the right.

Figure 4 is a similar detail, showing a modified arrangement hereafter described.

Figure 5 is a part sectional elevation of another construction of change gear mechanism, having the gear engaged.

Figure 6 is a similar view showing the gear disengaged by an axial sliding movement.

Figure 7 is an end elevation in section upon line 7—7 of Figure 6.

Figure 8 is an end elevation and Figure 9 a plan of the locking device separately.

Referring to Figures 1 and 2, which may be compared with Figures 3 and 4 of my prior patent specification No. 1,677,705, it will be seen that the shaft 11, hereafter referred to as the driving shaft, is mounted in alignment with a shaft 12, hereafter referred to as the driven shaft. Parallel to these shafts there is mounted a layshaft 13 carrying gears 14, 15, respectively in constant mesh with a gear 16 fast to the driving shaft 11, and with a gear 17 mounted rotatably upon the driven shaft 12. Each of the gears 16, 17 is provided with a hub 18, 19, cut to form internal clutch teeth 20, 21, with which there can be engaged the corresponding external clutch teeth 22, 23 of a sliding clutch member 24, mounted upon keys or splines upon the driven shaft 12.

The clutch member 24 is operated by a striking fork 25 engaging in the grooved collar 25$^1$; thus by operation of the clutch member towards the left, as viewed in Figure 1, the driving shaft 11 can be coupled direct to the driven shaft 12, while the gears 14, 15, 16, 17 revolve idly; alternatively by operation of the clutch member 24 in the opposite direction, the gear 17 can be coupled to the driven shaft 12, which is thus driven at a reduced speed by the operation of the gear train 14, 15, 16, 17.

The movements of the clutch member 24 are controlled by means of locking devices comprising a pair of rings 26, 27, each provided with two diametrically opposite fingers 28, 28¹ and 29, 29¹ respectively, which extend parallel to the driven shaft 12 and pass through arcuate slots 30 in the clutch member 24, the fingers being of correspondingly arcuate shape in cross section, as shown in Figure 2. The width of the fingers adjacent to their free ends is considerably less than the width of the slots 30, measured circumferentially, so that so long as the clutch member 24 has its slots 30 in engagement only with these narrow ends of the fingers, there is room for a certain amount of relative rotary motion, equal for example to the pitch of the clutch teeth 20, 21, 22, 23. The width of the fingers nearer to the rings 26, 27, is however increased by the provision of a shoulder 31 on one edge to substantially the same circumferential dimension as the free width of the slots 30, so that when the clutch member 24 has its slots in engagement with these wider portions of the fingers, the relative rotary motion allowed is substantially nil.

The opposite edge of each finger is also provided with a projection 32, preferably of the shape of a right-angled triangle, having one side perpendicular to the edge of the finger and another side inclined at 45 degrees thereto, and the length of the perpendicular side being substantially equal to the width of the shoulder 31 on the opposite edge of the finger.

As in my prior Patent 1,677,705, the rings 26, 27 are driven intermittently by means of spring-pressed balls 33 housed in recesses 34 in their rear faces, these balls being brought into contact with faces 35 inside the hubs 18, 19, as the clutch member 24 is moved towards the respective gear 16 or 17. The rings 26, 27 are enclosed by overhanging flanges 36 upon the said hubs, which limit the axial travel of the rings, while allowing their free rotation when withdrawn from the driving faces 35.

Each of the arcuate slots 30 has one of its sides undercut as indicated at 37 so as to provide a bevel tooth 38 of substantially the same triangular shape as the projection 32. The free width of the slot 30, measured from the point of the bevel tooth 38 to the opposite side of the same slot, is greater than the width of the fingers 28, 28¹, 29, 29¹ at their narrow free ends by the width of the shoulder 31 or the perpendicular length of the projection 32, but is less than the full width of the fingers including both the shoulder 31 and the projection 32. On the other hand, the width of the slot 30 at its inner part behind the tooth 38 is substantially equal to or slightly greater than the full width of the fingers including both the shoulder 31 and the projection 32.

Consequently as the clutch member 24 is moved axially along the fingers 29, 29¹, for example, that is towards the right in Figure 1, in the direction for changing from the direct drive towards a lower gear, its movement will be arrested by the projections 32 upon the said fingers. If the driving shaft 11, connected to the engine by way of the usual friction clutch (not shown), is now accelerated sufficiently, so as to speed up the gear wheel 17 (which was previously revolving more slowly than the clutch member 24) in the customary manner of changing down to a lower gear, the projection 32 will move off the bevel tooth 38, whereupon the clutch member 24 can be moved further toward the right until the shoulder 31 abuts against the face of the clutch member 24, thereby limiting its further movement towards the position for engaging the lower gear through the gear train 14, 15, 16, 17. As soon now as the gear wheel 17, which had thus reversed its original speed relation to the clutch member 24, begins to slow down again and tends thereby once more to reverse its speed relation to the clutch member 24, the fingers 29, 29¹ will move towards the opposite ends of the slots 30 under the effect of their driving connection through the ring 27 with the gear 17. But the projections 32 are now past the bevel teeth 38 of the slots 30 so that they can slide freely along the undercut portions 37 of the slots 30, while the shoulders 31 no longer abut against the face of the clutch member 24. Consequently the latter can continue its sliding movement by the operation of the striking fork 25 to complete the engagement of the selected gear 17.

It will be understood that the control provided by the locking devices described makes it necessary that the movements for changing gear be properly coordinated. Thus if the engine has not been accelerated sufficiently to bring the gear 17 to a speed slightly in excess of the speed of the clutch member 24, the projection 32 will abut against the tooth 38, thereby preventing further movement of the clutch member. In such case, a reversal of the speed relation by further acceleration of the engine will be required to bring the shoulder 31 into action, followed by a contrary reversal of the speed-relation to enable the projection 32 to slip into the undercut portion 37 of the slot 30 before complete engagement of the gear can be obtained.

It will also be understood that the exact relative position of the shoulder 31 and projection 32 upon each of the fingers is not limited to the disposition shown in Figures 1 and 3. For example, as shown in Figure 4, the shoulder 31 may be in line with the perpendicular side of the triangular projection 32, the end of the slot 30 being then formed with a recess 39 into which the corner of the shoulder 31 can enter in order to allow the projection 32 to slip past the point of the bevel tooth 38.

Figures 5 to 9 illustrate another embodiment of the present invention, only one pair of gears being shown.

In this construction, the driving shaft 41 carries a gear 42 with which another gear 43 slidably keyed upon the driven shaft 44 is adapted to engage, the gear 43 being operated by a striking fork (not shown); the driven gear 43 is provided with a pair of arcuate slots 45, arranged similarly to one pair of slots 30 in the previous construction, and each having a bevel tooth 46 and undercut portion 47.

The ring 48 carrying fingers 49, $49^1$, with shoulders 50 and projections 51, similar to the ring 26 of the previous construction, is engaged by the conical friction surface of a raceway 52 inside a non-slidable toothed element 53, rotatably mounted upon the driven shaft 44 and held against axial movement by a split collar 55 screwed to one side of the element and fitting in an annular groove 56 in the driven shaft. The element 53 is provided with narrow teeth 57 in constant mesh with the driving gear 42, so that the speed of the said element is governed by the speed of the driving shaft 41 and the friction surface of its raceway 52 can produce angular movement of the ring 48 within the limits of the slots 45, according as the gear 43 is running faster or slower than is required for engagement with the driving gear 42.

Figure 6 shows the position of the parts with the gears 42, 43 out of engagement. Assuming that the driver wishes to change down to a lower gear represented by the pair 42, 43, the usual friction clutch may be momentarily released and the gear shift lever is operated to disengage the gear previously in operation. From the neutral position, the gear shift lever is moved towards the engagement of the lower gear train 42, 43, its movement being stopped almost immediately by the first lock provided by the projections 51 which engage with the front faces of the bevel teeth 46. The engine is then accelerated until the toothed element 53 overruns the gear 43, whereupon the fingers 49, $49^1$ are carried to the other ends of the slots 45; this allows the gear 43 to make an initial step towards engagement, the movement being however arrested by the second lock provided by the shoulders 50 abutting against the face of the gear 43, while the projections 51 slip behind the bevel teeth 46.

So soon as the driver feels the resulting slight forward movement of the gear shift lever, he frees the friction clutch, which allows the driving shaft 41 to slow down, thereby again changing the speed relation of the driving and driven gears, but in the contrary sense to the previous change; consequently the shoulders 50 will be carried back into the free portion of the slots 45, and the projections 51 being now past the bevel teeth 46 will no longer oppose the forward movement of the gear 43, the latter being thus brought into complete engagement with the driving gear 42 by the continued operation of the gear shift lever.

An important feature of the present invention is that when used for controlling the change gear in the downward direction, it entirely prevents the possibility of the slidable gear wheel or clutch member passing through the second lock before the driving shaft has been accelerated sufficiently to free the first lock and the speed-relation of the two members has subsequently been again reversed, in the contrary sense, both locks having to be passed through in succession before the clutch or gear can commence to engage. In other words, there is no midway position in the movement of the angularly displaceable locking device in which it is possible for the sliding gear or clutch member to slip through into driving engagement without coming up against the second lock. This second lock also provides means whereby the driver is warned that the engine has been accelerated sufficiently and that the moment has come for him to free the main friction clutch.

The triangular shape of the first stop and the beveling of the tooth in the member with which it engages, are important for two reasons;—(1) it would not be possible to withdraw the disengaged member but for the co-operating beveled surfaces which angularly displace the locking device so that the slidable member is not locked upon withdrawal; (2) it reduces the length of travel of the slidable member and so shortens both the shaft and the gear box.

It will be obvious that when using the improved locking device for controlling the change of gear in the upward direction, for example from middle to high gear, the engine will not have to be accelerated for producing the first reversal of the speed relation of the gear or clutch members, but on the contrary the clutch member will pass freely through the first lock and time will have to be allowed for the engine or friction clutch to slow down, as in the ordinary operation of shifting gears, in order to pass through the second lock into complete engagement.

When positive clutches controlled in accordance with this invention are used for isolating change speed gears, the gear shift lever is provided with means such as a projection which interferes with the operating lever of the isolating clutch all the time that the gear shift lever is in neutral, the said projection being only moved out of the way after either the direct-drive clutch or one of the gear trains has commenced to engage. This arrangement renders it impossible to re-engage the isolating clutch before the direct drive clutch or the gear train respectively has commenced engagement; consequently there can be no clashing of clutch-jaws or gear-teeth at such times. Obviously, the isolating clutch can be disengaged and re-engaged either by the main friction clutch pedal or by the gear shift lever.

Means may be provided, for example as described in my prior patent specification already mentioned, for unlocking the gear control in order to allow of engaging a selected gear when one of the normally rotating members is stationary, more particularly for engaging the low gear of an automobile for starting purposes. Similarly means may be provided for unlocking the gear control when the normally driven shaft is rotating and the engine or clutch shaft is stationary.

What I claim is:—

1. In a change gear mechanism, a selectively engageable pair of members transmitting rotary power in both directions of rotation, means for engaging the selected pair by sliding movement of one member of said selected pair, and a locking device for preventing engagement of said selected pair until the speeds of their engaging surfaces are approximately equal, said locking device comprising two successively acting stops for controlling the sliding movement of said one member of said selected pair, the first of said stops permitting an initial movement of said one member towards engagement following a reversal of the previous speed-relation of said selected pair, and the second of said stops preventing further movement of said one member towards engagement until the speed relation of said selected pair has again reversed.

2. In a change gear mechanism, a selectively engageable pair of members transmitting rotary power in both directions of rotation, means for engaging the selected pair by sliding movement of one member of said selected pair, and a locking device for preventing inopportune engagement of said selected pair of power-transmitting members, comprising means controlling said sliding movement and having a limited angular movement in relation to one member of said selected pair, said controlling means being in non-positive engagement with the other member of said selected pair during the operation of engagement, a stop carried by said controlling means for limiting said sliding movement towards engagement at one end of said angular movement, and a second stop carried by said controlling means for limiting said sliding movement towards engagement at the other end of said angular movement, said stops coming into operation successively at different points in the sliding movement of said one member towards engagement, the operation of the first of said stops necessitating a double reversal of the speed relation of the engaging surfaces of said pair of members before said members can be engaged.

3. In a toothed change gear mechanism for transmitting rotary power in both directions of rotation, comprising a member slidable in relation to a cooperating member for engaging a selected gear, a locking device for preventing inopportune engagement of said gear by controlling the axial movement of said slidable member, said locking device including means for producing two separate controlling locks, the first lock preventing axial movement of said slidable member so long as the driving member is rotating more slowly than the driven member and until the speed-relation of said members has reversed, the second lock coming into operation after the first lock has been freed and the slidable member has made an initial movement towards engagement, and said second lock being freed only after a second reversal of the speed-relation of said slidable member and said cooperating member.

4. In a toothed change gear mechanism for transmitting rotary power in both directions of rotation, comprising a member slidable in relation to a cooperating member for engaging a selected gear, a locking device for preventing inopportune engagement of said gear by controlling the axial movement of said slidable member, said locking device including two stops being brought into operation by differences in the angular speeds of said slidable and cooperating members and acting successively to limit said axial movement, one of said stops operating so long as said slidable member overruns said cooperating member, the other of said stops operating in the event that said slidable member underruns said cooperating member, whereby a double reversal of the speed-relation of said slidable and cooperating members is necessary before said gear can be engaged.

5. In a toothed change gear mechanism for transmitting power in both directions of rotation, comprising a member slidable in relation to a cooperating member for engaging a selected gear, a locking device for preventing inopportune engagement of said gear by controlling the axial movement of said slidable member, said locking device including a controlling ring adapted for non-positive engagement with one of said members and capable of limited angular displacement in relation to the other of said members, an element carried by said controlling ring and engaging with said other member, and two stops formed upon said element, said stops operating successively to limit the axial movement of said sliding member during opposite angular movements of said controlling ring relative to said other member, whereby the axial movement of said slidable member to complete engagement becomes possible only after both stops have been passed successively.

6. In a power transmission including positive members arranged to transmit power in both directions of rotation, one of said members being slidable into engagement with the other, a locking device for preventing inopportune engagement, comprising two stops adapted to operate in different directions of relative rotation of said members and at successive points in the travel of said slidable member, the first of said stops being brought into operation by the relative rotation when the driving member overruns the driven member, and the other of said stops being brought into operation by the relative rotation when the driven member commences to overrun the driving member.

7. In a power transmission including members adapted to transmit power positively in both directions of rotation, one of said members being slidable into engagement with the other, a locking device for preventing inopportune engagement comprising a controlling ring adapted for frictional engagement with one of said members and capable of limited angular displacement in relation to the other of said members, an element carried by said controlling ring and engaging with said other member, and two stops formed upon said element, said stops operating successively during the travel of said slidable member for limiting said travel until the engaged stop is removed by a reversal of the speed relation of the engaging surfaces of said members.

8. In a power transmission including power-transmitting members arranged to transmit power in both directions of rotation, one of said members being slidable into engagement with the other, a locking device for the prevention of inopportune engagement comprising a controlling ring adapted for non-positive engagement with one of said members and capable of limited angular displacement in relation to the other of said members, an element carried by said controlling ring and engaging with said other member, two stops formed upon said element, said stops operating successively during the travel of said slidable member for limiting said travel until the engaged stop is removed by a reversal of the speed relation of the engaging surfaces of said members, and the first of said stops being of a triangular shape with one side inclined at an angle of about 45 degrees to the axis, and a bevel tooth in said other member, said bevel tooth cooperating with said triangular shaped first stop.

In testimony whereof I affix my signature.

WILLIAM THOMAS CARLING.